(12) United States Patent  
Martin

(10) Patent No.: US 7,672,586 B2
(45) Date of Patent: Mar. 2, 2010

(54) ALLOCATING CONNECTIONS IN A COMMUNICATION SYSTEM

(75) Inventor: James Martin, London (GB)

(73) Assignee: Ericsson AB, Stockholm (SE)

( * ) Notice: Subject to any disclaimer, the term of this patent is extended or adjusted under 35 U.S.C. 154(b) by 633 days.

(21) Appl. No.: 10/508,749

(22) PCT Filed: Mar. 28, 2003

(86) PCT No.: PCT/GB03/01373

§ 371 (c)(1),
(2), (4) Date: Apr. 14, 2005

(87) PCT Pub. No.: WO03/084131

PCT Pub. Date: Oct. 9, 2003

(65) Prior Publication Data

US 2005/0226210 A1    Oct. 13, 2005

(30) Foreign Application Priority Data

Mar. 28, 2002    (GB)    ................... 0207505.9

(51) Int. Cl.
*H04J 14/00* (2006.01)
(52) U.S. Cl. ............................................. 398/49
(58) Field of Classification Search ............ 398/49–51, 398/79, 83, 22
See application file for complete search history.

(56) References Cited

U.S. PATENT DOCUMENTS 5,629,925 A    5/1997    Pfeiffer et al.

| | | | |
|---|---|---|---|
| 6,570,872 B1* | 5/2003 | Beshai et al. | 370/369 |
| 2002/0191247 A1* | 12/2002 | Lu et al. | 359/124 |
| 2003/0020977 A1* | 1/2003 | Smith et al. | 359/110 |
| 2003/0117678 A1* | 6/2003 | Chang et al. | 359/157 |
| 2004/0052520 A1* | 3/2004 | Halgren et al. | 398/5 |

FOREIGN PATENT DOCUMENTS

| | | |
|---|---|---|
| EP | 0 994 582 A1 | 4/2000 |
| GB | 2 339 108 A | 1/2000 |
| JP | 6164631 | 6/1994 |
| WO | WO 97/50212 | 12/1997 |

OTHER PUBLICATIONS

*Routing and Wavelength Assignment Strategies in WDM Networks*, ACTA Electronic Sinica, vol. 29, No. 12, Dec. 2001, L. Qibin, et al., pp. 1-8.
*CR-LDP: The Traffic Engineering Extension to MPLS LDP*, Data Communications 2001, vol. 2, W. Jaichun, et al., pp. 1-9.

(Continued)

*Primary Examiner*—Quan-Zhen Wang
(74) *Attorney, Agent, or Firm*—Kirschstein, et al.

(57) ABSTRACT

Dynamic allocation of connections is performed in a communication network. When a new connection request is received by the network management system this request can be accepted or rejected. In case it is accepted, the connection can be set up by allocating new or reconfiguring existing connection resources. The reconfiguration options are constrained to a set of allowed reconfigurations which is a subset of the set of all possible reconfigurations of the existing connections on the network.

12 Claims, 8 Drawing Sheets

OTHER PUBLICATIONS

*Impairments and Other Constraints on Optical Layer Routing*, IETF51 IPO WG, Aug. 2001, Angela L. Chiu, et al., Celion Networks, Slide 1 of 17.

Mukherjee S et al: "An adaptive connection admission control policy for VBRservice class" INFOCOM '98. Seventeenth Annual Joint Conference of the IEEE Computer and Communications Societies. Proceedings. IEEE San Francisco, CA, USA.

Le Bodic G et al: "Resource cost and QoS achievement in a contract-based resource manager for mobile communications systems" IEEE Journal, 2000, pp. 392-397, XP010515108.

Devalla B et al: "Adaptive connection admission control for mission critical real-time communication networks" Military Communications Conference, 1998. Milcom 98. Proceedings., IEEE Boston, MA, USA Oct. 18-21, 1998, New York, NY, USA,IEEE, US, 18.

Sahoo A et al: "Adaptive connection management for mission critical applications over ATM networks" Aerospace and Electronics Conference, 1998. Naecon 1998. Proceedings of the IEEE 1998 National Dayton, OH, USA July 13-17, 1998, New York, NY, USA,IEEE.

* cited by examiner (i)  $\lambda_2$        (3)
     $\lambda_1$   (1)   (2)   (2)
         $L_1$   $L_2$   $L_3$ (ii) $\lambda_2$        (3)
     $\lambda_1$   (1)      (4)
         $L_1$   $L_2$   $L_3$ (iii) $\lambda_2$
     $\lambda_1$   (1)   (3)   (4)
         $L_1$   $L_2$   $L_3$ (iv) $\lambda_2$        (5)   (5)
     $\lambda_1$   (1)   (3)   (4)
         $L_1$   $L_2$   $L_3$ (v) $\lambda_2$        (5)   (5)
     $\lambda_1$   (1)      (4)
         $L_1$   $L_2$   $L_3$ (i)   $\lambda_2$                (3)
      $\lambda_1$ $\frac{(1)}{L_1}$ $\frac{(2)}{L_2}$ $\frac{(2)}{L_3}$ (ii)  $\lambda_2$                (3)
      $\lambda_1$ $\frac{(1)}{L_1}$      $\frac{(4)}{L_3}$ (iii) $\lambda_2$
      $\lambda_1$ $\frac{(1)}{L_1}$ $\frac{(3)}{L_2}$ $\frac{(4)}{L_3}$ (iv)  $\lambda_2$       (5)   (5)
      $\lambda_1$ $\frac{(1)}{L_1}$ $\frac{(3)}{L_2}$ $\frac{(4)}{L_3}$ (v)   $\lambda_2$       (5)   (5)
      $\lambda_1$ $\frac{(1)}{L_1}$      $\frac{(4)}{L_3}$

ALLOCATING CONNECTIONS IN A COMMUNICATION SYSTEM

This application is a 371 of PCT/GB03/01373 Mar. 28, 2003.

This invention relates to a communications system.

More particularly, the invention relates to a communications system comprising: a communications network comprising network nodes and network links between the network nodes; and a network management system for allocating connections to said network, said connections utilising network nodes and network links.

Requests for connections on the network are made over time to the network management system. Each request may be accepted or rejected. If a request is accepted, the connection is allocated to the network, and continues for a duration (which may or may not be known at the time of the request). If accepted, a connection will require the use of some of the resources of the network. In this regard, a network may be considered a set of resources R. Typically, to a connection request there is associated a set A of options, each option of the set being a way of carrying the connection, i.e. each member 'a' of the set A of options is itself a set of network resources, and is a subset of R. Each member 'a' of set A is capable of carrying the requested connection. The set A of options will vary from request to request. One member 'a' of the set A is chosen at the time that the connection begins to be carried by the network. Of course, it may well be that some of the members of the set A of options are not available due to the presence of other connections on the network. While a connection is using a set 'a' of network resources, none of these resources may be used by other connections carried by the network.

In an unreconfigurable network, i.e. a network where the connections are unreconfigurable, the initial choice 'a' is fixed for the duration of the connection, and may not be changed. This connection will use the set 'a' of network resources throughout its duration.

In a reconfigurable network, on the other hand, the choice may be changed during the course of the connection (the connection is 'reconfigured'). Any other member a' of the initial set A of options may be substituted for 'a' while the connection is underway. It may be that such reconfigurations of already existing connections can be carried out at the time of a new connection request, in order to allow the network to accommodate the new connection, or it may be that such reconfigurations are carried out at other times in anticipation of possible future requests (for example, this latter case may occur if the amount of time needed to carry out a reconfiguration is longer than the amount of time allowed between the receipt of a new connection request and the start of the new connection).

Due to its greater flexibility, a reconfigurable network will typically be able to accept a larger proportion of the arriving connection requests than a comparable unreconfigurable network, and so operate more efficiently. However, allowing reconfigurability also has disadvantages. In particular, it may reduce the quality of service that the network provides, since reconfiguring a connection may involve interrupting it temporarily.

According to the present invention there is provided a communications system comprising: a communications network comprising network nodes and network links between the network nodes; and a network management system for allocating connections to said network, said connections utilising network nodes and network links, in respect of each said connection there being a number of possible ways to implement the connection on the network, said network management system, when allocating a connection to the network, selecting one of the said number of possible ways to implement that connection, said network management system, when deciding whether to accept or reject a request for a said connection on said network, having the option to accommodate said request to reconfigure existing connections on said network by selecting, in respect of the or each existing connection reconfigured, a different one of the said number of possible ways to implement that connection, the reconfiguration by said network management system being constrained to a set of possible reconfigurations which is a subset of the set of all possible reconfigurations of said existing connections on the network Thus, the present invention relates to partially reconfigurable networks, in which some reconfigurations, but not others, are allowed. Those that are allowed may be those that can be carried out with no interruption or impairment of service, or with only a relatively unimportant interruption or impairment of service. In this way much of the flexibility and hence advantage in efficiency of a reconfigurable network may be obtained, with little or none of the associated disadvantage.

In a first communications system in accordance with the present invention, said existing connections on the network comprise reconfigurable and unreconfigurable connections, and said reconfiguration by said network management system is constrained to reconfiguration of only said reconfigurable connections.

Thus, in the first communications system, some connections are reconfigurable while others are not. Those connections that are unreconfigurable experience a higher quality of service than those that are reconfigurable, since they are guaranteed not to experience interruptions.

In a second communications system in accordance with the present invention, said reconfiguration by said network management system is constrained such that each existing connection on the network may be reconfigured, but not in all ways possible for that connection.

Thus, in the second communications system, all connections are reconfigurable to some extent, but not completely. At the time a connection is requested, a set A of options is available. Suppose that if the option 'a' (a member of A) is chosen, this choice can later be changed, but the new choice may only be made from a smaller subset A'(a) of A. This smaller subset is denoted by A'(a) since it will typically depend on the initial option 'a' that is chosen. Hence reconfiguration of the connection is possible, but nonetheless the initial choice restricts the later flexibility.

In a third communications system in accordance with the present invention, said existing connections on the network switch between reconfigurable and unreconfigurable states, and said reconfiguration by said network management system is constrained to reconfiguration of only those existing connections reconfigurable at the time said request for a said connection on said network is made.

Thus, in the third communications system, each connection is sometimes reconfigurable and at other times unreconfigurable. For example, connection requests may precede by some time the start of active use of the connection. As soon as connection requests are accepted, they must be allocated resources in the network, but are reconfigurable until active use begins. After active use begins, they are unreconfigurable. Or, more generally, individual connections may alternate between in use active and not in use inactive states. While active they are unreconfigurable, but while inactive they are reconfigurable. In each case, at any given time the network will typically be carrying a mixture of reconfigurable and unreconfigurable connections.

Examples of communication networks are as follows: a fixed-line network; a mobile network; a network employing wavelength division multiplexing; a network employing time-division multiplexing or other slotting mechanism; a network employing code-division multiplexing, an ATM or MPLS or GMPLS or MPλS network. The set R of network resources may include, for example, links (maybe including virtual links); channels (maybe virtual) or wavelengths on a link; wavelength converters or transponders on a link or at a node; switches (or individual matches on a switch); timeslots; frequency bands; codeslots; A 'connection' may, for example, be: an end-to-end path often termed a circuit (maybe a lightpath); two or more parallel paths with common endpoints; a point-to-multipoint connection; a multipoint-to-multipoint connection; a virtual private network.

The invention will now be described, by way of example, with reference to the accompanying drawings, in which.

Figure 1:
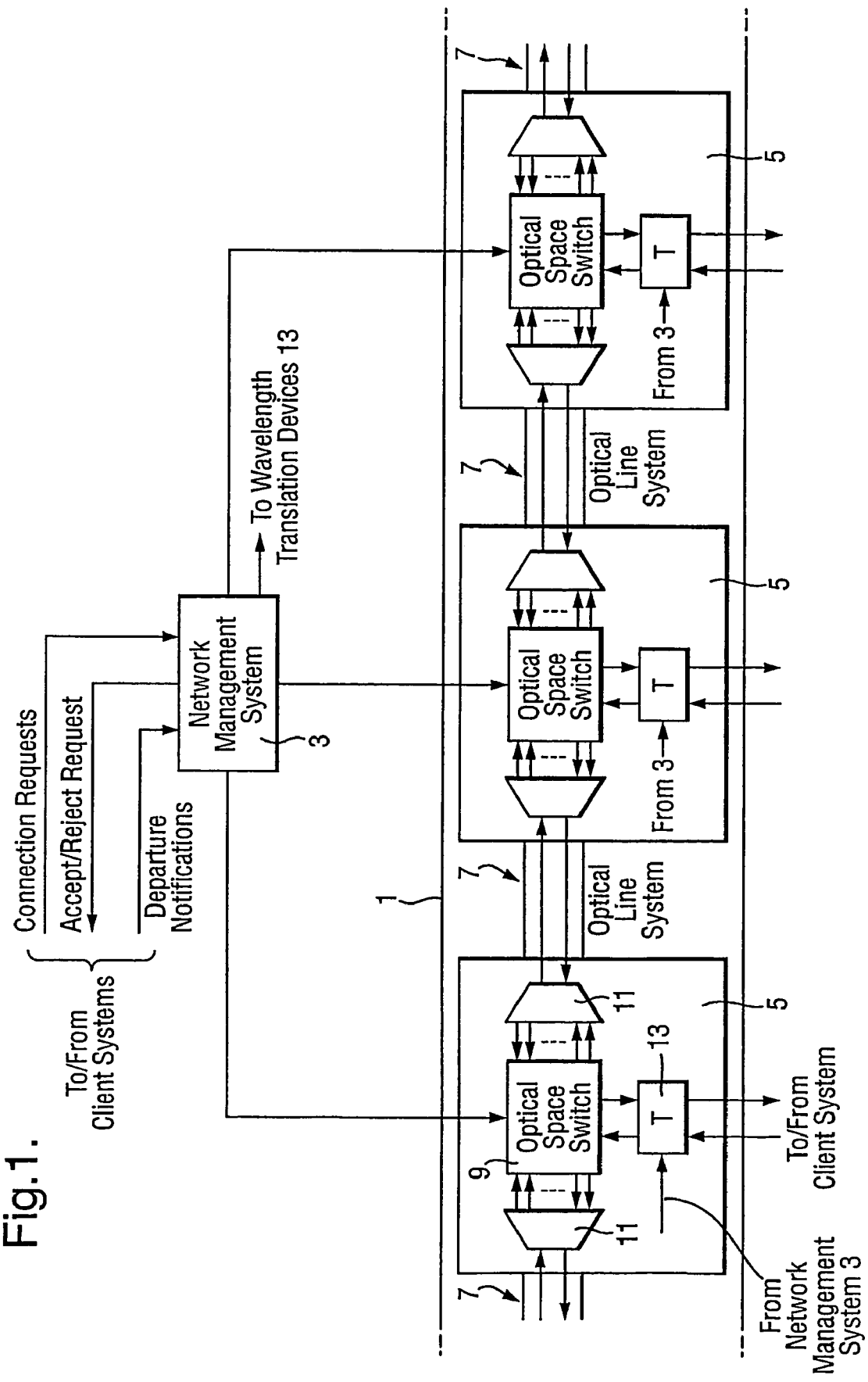
FIG. 1 is a block schematic diagram of a first communications system in accordance with the present invention.

Referring to FIG. 1, the first communications system comprises a communications network 1 and a network management system 3. Network 1 employs wavelength division multiplexing, and is represented by an elemental part of a branch of the network comprising three network nodes 5 and four network links 7. The two links 7 to the extreme left and right of FIG. 1 connect to the remainder of the network. Each node 5 comprises an optical space switch 9, two wavelength division multiplexers 11, and a wavelength translation device 13. Each device 13 is connected to a respective client system (not shown).

Communication over network 1 is possible at each of a number of wavelengths 'n'. However, the network is capable of supporting on any link 7 only one connection at each of the 'n' wavelengths, i.e. the maximum number of possible connections on any link 7 is 'n'. Further, a connection over the network between two client systems must occupy a predetermined set of links 7 between the systems, and must utilise the same wavelength on all links of the set.

Each wavelength translation device 13 both (i) receives from its client system signals for transmission by the network, and (ii) passes to its client system signals received from the network. Each device 13 both (i) translates signals received from its client system to signals of a selected one of the 'n' wavelengths, and (ii) translates signals of a selected wavelength received from the network to signals of a form suitable for its client system. As explained further below, network management system 3 determines the wavelengths selected. Each optical space switch 9 routes signals over the network. This it does under the control of management system 3. Thus, each switch 9 routes selected wavelength signals (i) from its associated wavelength translation device 13 to an adjacent network node 5, or (ii) to its associated device 13 from an adjacent node 5, or (iii) from one adjacent node 5 to another. Each wavelength division multiplexer 11 both (i) multiplexes together selected wavelength signals received from its associated switch 9, and (ii) demultiplexes apart multiplexed together selected wavelength signals received from an adjacent node 5.

In operation, a client system, say client system A, puts to network management system 3 a request for connection to another client system, say client system B. As explained further below, network management system 3 determines whether a predetermined network route between client systems A and B is or can be made available on any of the aforesaid 'n' wavelengths. If not, system 3 replies rejecting the request. If so, system 3 replies accepting the request, and (i) sets to the selected wavelength the translation devices 13 associated with client systems A and B, and (ii) switches the optical space switches 9 on the aforesaid predetermined route so as to make a connection of the selected wavelength between client systems A and B. Client system A, on departure from the network, notifies network management system 3.

Figure 2:
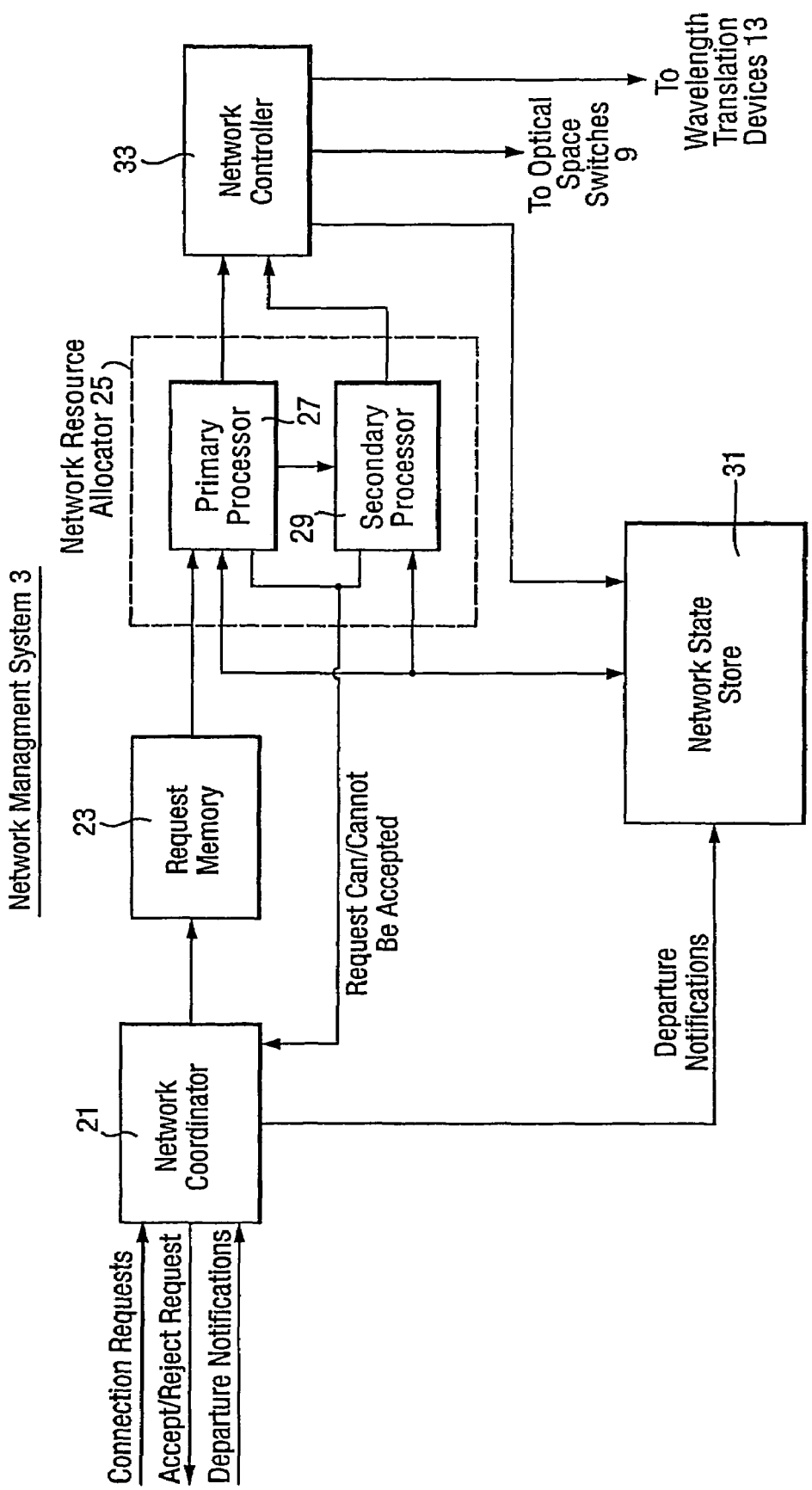
FIG. 2 is a block schematic diagram of a network management system of the communications system of FIG. 1.

Referring to FIG. 2, each connection request to network management system 3 is received by network coordinator 21, which passes the request on to request memory 23, where it is held in a request queue for subsequent processing by network resource allocator 25. Resource allocator 25 processes the connection request in an attempt to identify network resources that may be allocated to accept the request. The request is for a connection between two client systems, systems A and B. In respect of each and every possible required connection between client systems on the network, there is predefined or pre-assigned one network route to be used in the event that that particular connection is required. Resource allocator 25 has knowledge of these predefined network routes, and determines, as will now be explained, whether the route predefined in respect of the connection between client systems A and B, say route AB, may be used given current network usage. In this regard, network state store 31 maintains a continuously updated record of current network usage.

In response to receipt of the connection request, primary processor 27 examines store 31 to determine whether any one of the aforementioned 'n' wavelengths is entirely absent from the links 7 of route AB, i.e. not one link of route AB uses the wavelength. Let there be 'm' links in route AB denoted $1_1, 1_2, 1_3, \ldots 1_m$. Let the 'n' possible connection wavelengths be denoted $w_1, w_2, w_3, \ldots w_n$. Processor 27 commences with wavelength $w_1$ and examines all 'm' links to determine whether wavelength $w_1$ is being used on one or more of the links. If so, processor 27 continues with wavelength $w_2$, and so on. If at any stage a wavelength is discovered that is not being used, processor 27 informs network coordinator 21 that the connection request can be accepted, and instructs network controller 33 to (i) set the wavelength translation devices 13 associated with client systems A, B to the free wavelength, and (ii) switch the optical space switches 9 on route AB so as to make a connection on the free wavelength between client systems A, B. Network controller 33 updates network state store 31 that it has done this. If, after trying all 'n' wavelengths, primary processor 27 has not discovered a free wavelength on route AB, processor 27 initiates operation of secondary processor 29.

It is to be appreciated that the connection requests made to network management system 3 are for connections of two types: (i) high priority, high quality of service, hence unreconfigurable connections; and (ii) low priority, relatively low quality of service, hence reconfigurable connections. Thus, the existing connections on the network are a mix of both reconfigurable and unreconfigtrable connections. The record of current network usage contained in network state store 31 includes information as to which of the current network connections are reconfigurable and which are not In a first step, secondary processor 29 examines store 31 to determine whether there is present on the network on wavelength $w_1$ an unreconfigurable connection that includes a link in route AB. If so, processor 29 tries wavelength $w_2$, and so on, until a wavelength is found that is not used by an unreconfigurable connection including a link in route AB. If no wavelength is found, processor 29 informs network coordinator 21 that the connection request cannot be accepted. Assume that wavelengths $w_1$, $w_2$, $w_3$ do not meet the condition, and that wavelength $w_4$ is the first wavelength that does.

In a second step, processor 29 creates a list of all reconfigurable connections on the wavelength $w_4$ that include a link in route AB, i.e. include one or more of the links $1_1, 1_2, 1_3, \ldots 1_m$. Let this list of connections be $c_1, c_2, c_3, \ldots c_p$. In respect of each of connections $c_1, c_2, c_3, \ldots c_p$, processor 29 examines store 31 to determine whether there is a wavelength other than $w_4$ on which all links of the connection are free. If this is found to be the case for all connections $c_1, c_2, c_3, \ldots c_p$, processor 29 informs network coordinator 21 that the connection request can be accepted, and instructs network controller 33 to (i) reconfigure all connections $c_1, c_2, c_3, \ldots c_p$ to the identified free wavelengths, and (ii) make on wavelength $w_4$ the requested new connection. If, in respect of one or more of connections $c_1, c_2, c_3, \ldots c_p$, there is not a wavelength other than $w_4$ on which all links of the connection are free, then processor 29 returns to the first step to consider the next wavelength $w_5$ following $w_4$.

Processor 29 determines (as it did in respect of wavelengths $w_1$ to $w_4$) whether there is on wavelength $w_5$ an unreconfigurable connection that includes a link in route AB. Assume that wavelengths $w_5$ and $w_6$ do not meet this condition, and that wavelength $w_7$ is the next that does. In respect of wavelength $w_7$, processor 29 proceeds again to the second step, and determines (as it did before in respect of wavelength $w_4$) whether it is possible to reconfigure to a free wavelength all the reconfigurable connections on wavelength $w_7$ that include a link in route AB. If so, the new connection request can be accepted on wavelength $w_7$. If not, processor 29 returns to the first step to consider wavelength $w_8$. Processor 29 follows the aforesaid first step/second step procedure until either the new connection request can be accepted, or wavelength $w_n$ is reached without success.

There will now be described the operation of primary and secondary processors 27, 29 to allocate connections to the very simple network of FIG. 3.

Figures 3, 4:
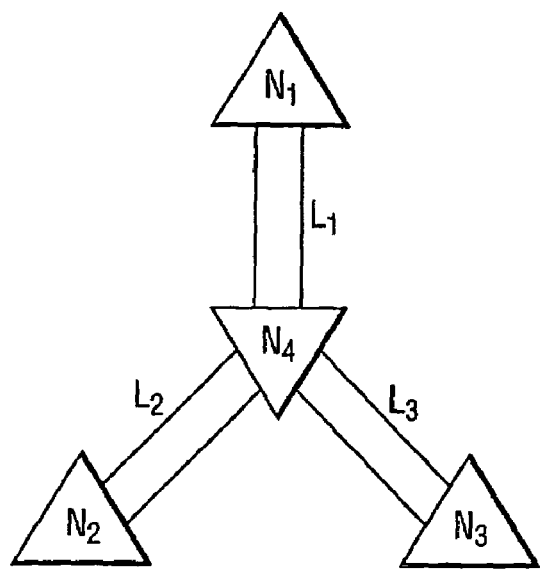
FIG. 3 depicts a very simple communications network employing wavelength division multiplexing.
FIG. 4 illustrates the allocation of connections by the network management system of FIG. 2 to the very simple network of FIG. 3.

The network of FIG. 3 consists of four network nodes N1, N2, N3, N4 and three network links L1, L2, L3. Each link L1, L2, L3 is capable of supporting a connection on each of wavelengths λ1 and λ2, i.e. the aforesaid 'n' equals two. Low and high priority connections are possible. Low priority connections may be reconfigured while in progress, i.e. their wavelength may be switched from λ1 to λ2 or visa versa. High priority connections may not be reconfigured.

FIG. 4 illustrates the changing state of the FIG. 3 network over a period of time. Dotted lines represent low priority connections and solid lines high priority connections. The connections are numbered in order of arrival.

The network begins empty. The first arriving request (1) is for a high priority connection on link L1 alone. Processor 27 accepts the request and allocates it to wavelength λ1. The next request (2) is for a low priority connection on links L2 and L3. Processor 27 accepts this request on wavelength λ1 also. The next request (3) is for a low priority connection on link L2. Processor 27 accepts this request on wavelength λ2 (this is the only possible choice since wavelength λ1 on link L2 is already occupied by connection (2)). At this stage the state of the network is as in diagram (i).

Next, connection (2) departs. Another request (4) arrives for a high priority connection on link L3. Processor 27 accepts this request on wavelength λ1. Now the network state is given in diagram (ii).

A new request (5) arrives for a low priority connection on links L2 and L3. Now, at present, λ1 on L3 is occupied by connection (4), while λ2 on L2 is occupied by connection (3), so there is no wavelength immediately available as determined by processor 27. In an unreconfigurable network, request (5) would have to be rejected at this stage. However, here connection (3) is reconfigurable, so it is moved by processor 29 to wavelength λ1 (see diagram (iii)). Now processor 29 can accept request (5) on λ2 (diagram (iv)).

Next, connection (3) departs (see diagram (v)). Then a new request (6) arrives for a connection on links L1 and L2. However, connection (5) blocks L2 on λ2 while connection (1) blocks L1 on λ1. Connection (1) is unreconfigurable, and connection (5), though itself reconfigurable, cannot be moved due to unreconfigurable connection (4), so processor 29 must reject request (6).

In the above description with reference to FIGS. 1 to 4, a route is predefined in respect of each and every possible required connection on the network, and a wavelength is chosen on which to make a connection on the predefined route. When a reconfigurable connection is reconfigured, the route of the connection does not change, only the wavelength of the connection. It is to be appreciated that the present invention extends to the case where the route and wavelength of a connection may be chosen. Consequently, when a reconfigurable connection is reconfigured, the route and/or wavelength may change.

Figure 5:
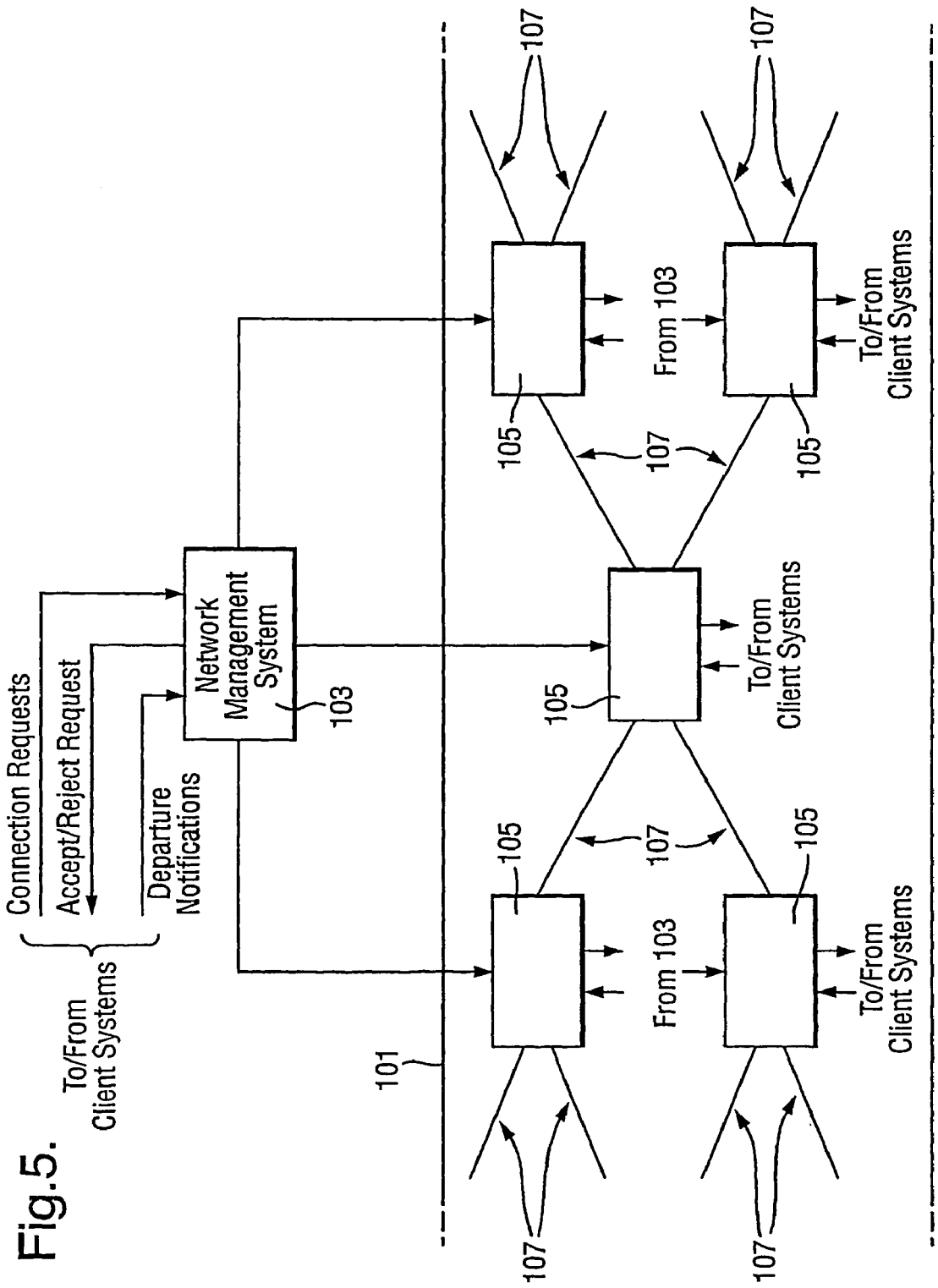
FIG. 5 is a block schematic diagram of a second communications system in accordance with the present invention.

Referring to FIG. 5, the second communications system comprises a communications network 101 and a network management system 103. Network 101 employs routing choice, and is represented by an elemental section thereof comprising five network nodes 105 and twelve network links 107. Each link 107 connects two nodes 105, and consists of one or more channels (not shown). Links 107 may have the same or differing numbers of channels. Each node 105 comprises a switch for switching signals between the links 107 connected to that node. In particular, each node is capable of switching a signal it receives on a channel of a link to any channel of any other link also connected to that node. Each node 165 is connected to a respective client system (not shown), and is also capable of switching signals from its client system onto the network, and from the network to its client system. Network management system 103 controls the switching of nodes 105.

Communication over network 101 between two client systems requires two paths to be established between the two network nodes 105 associated with the client systems. A path comprises a chain of links 107 connecting the two network nodes 105. One path of the required two is termed the main path, the other the standby path. The two paths must be disjoint, i.e. no link 107 may be common to both paths. Each path requires the use of only one channel on each of the links 107 used by the path It is to be noted that various other requirements for the paths may apply in a situation where main and standby paths are required. For example, it is also common that the main and standby paths are required not to have any node in common, except the two endnodes. The main path is not reconfigurable. It must remain the same throughout the duration of the connection. However, the standby path is reconfigurable. It may be changed while the connection is underway (but always subject to the restriction that it shares no link with the main path).

In operation, a client system, say client system A, puts to network management system 103 a request for connection to another client system, say client system B. As explained further below, network management system 103 determines whether it is possible to establish between client systems A and B a connection comprising main and standby paths as aforesaid. If not, system 103 replies rejecting the request. If so, system 103 replies accepting the request, and configures nodes 105 to set up a connection comprising main and standby paths between client systems A and B. Client system A, on departure from the network, notifies network management system 3.

Figure 6:
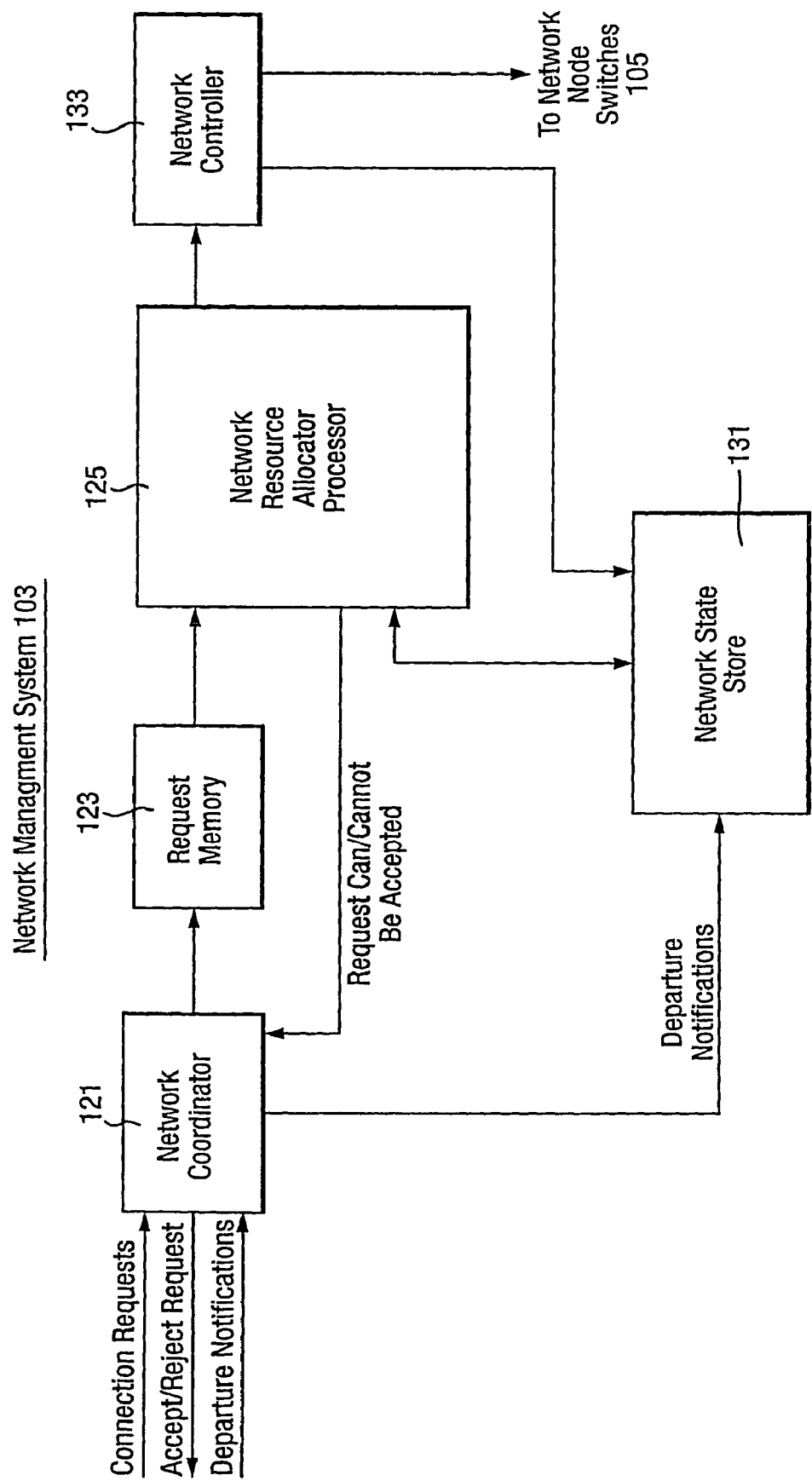
FIG. 6 is a block schematic diagram of a network management system of the communications system of FIG. 5.

Referring to FIG. 6, each connection request to network management system 103 is received by network coordinator 121, which passes the request on to request memory 123, where it is held in a request queue for subsequent processing by network resource allocator processor 125. Resource allocator processor 125 processes the connection request in an attempt to identify network resources that may be allocated to accept the request The request is for a connection between client systems A and B. Processor 125 determines, as will now be explained, whether, given current network usage, it is possible to establish between client systems A and B a connection comprising main and standby paths. In this regard, network state store 131 maintains a continuously updated record of current network usage comprising all the main and standby paths currently on the network.

There will now be described the operation of network resource allocator processor 125.

Each connection requires a main path and a standby path, which must be disjoint. The standby path may be reconfigured while the connection is underway, but the main path may not.

For each pair p of endpoints between which a connection request may arrive, there is stored in processor 125 a list R(p), established in advance, of possible paths joining the endpoints. The list is in order of preference, for example shortest paths first. It is to be noted that for any path $r \in R(p)$ ($\in$ means is a member of) there must be a path $r' \in R(p)$ such that r and r' are disjoint, otherwise r could never be used as a main or standby path due to the restriction that main and standby paths must be disjoint.

Suppose there are $n \geq 0$ connections currently being carried by the network, with endpoint pairs $P_1, \ldots P_n$, with main paths $r_1^{(m)}, \ldots r_n^{(m)}$ and with standby paths $r_1^{(s)}, \ldots r_n^{(s)}$. Note that, for each i, $r_i^{(m)}$ and $r_i^{(s)}$ are disjoint. Assuming a request arrives for a new connection between the pair of endpoints $p_0$, processor 125 tries the paths in $R(p_0)$ in order as candidates for the main path for the new connection.

For each such path $r_0^{(m)} \in R(p_0)$, is it possible to assign the main path to $r_0^{(m)}$? There needs to be a new set of standby paths $\tilde{r}_0^{(s)}, \tilde{r}_1^{(s)}, \ldots \tilde{r}_n^{(s)}$ such that the following three conditions are satisfied: (i) $\tilde{r}_i^{(s)} \in R(p_i)$ for each i; (ii) $r_i^{(m)}$ and $\tilde{r}_i^{(s)}$ are disjoint for each i; and (iii) the network can carry all the paths $r_0^{(m)}, r_1^{(m)}, \ldots, r_n^{(m)}$ and $\tilde{r}_0^{(s)}, \tilde{r}_1^{(s)}, \ldots, \tilde{r}_n^{(s)}$ simultaneously. Processor 125 looks for such a set. It does this by an exhaustive search of all the possible combinations of paths from $R(p_i), 0 \leq i \leq n$.

If processor 125 finds such a set it informs network coordinator 121 that the connection request can be accepted, and instructs network controller 133 to switch the network node switches 105 to: (i) assign the main path of the new connection to $r_0^{(m)}$, and the standby path to $\tilde{r}_0^{(s)}$; and (ii) reassign the standby paths of the n existing connections from $r_i^{(s)}$ to $\tilde{r}_i^{(s)}$, where $1 \leq i \leq n$ (if in fact $\tilde{r}_i^{(s)} = r_i^{s}$ then no reassignment is necessary for that path). Network controller 133 updates network state store 131 that it has done this. If no such set is found, processor 125 tries the next member of the set $R(p_0)$ as a candidate for the main path of the new connection. If all the members of $R(p_0)$ have been tried in this way and none found suitable, processor 125 informs network coordinator 121 that the connection request cannot be accepted.

Figure 7:
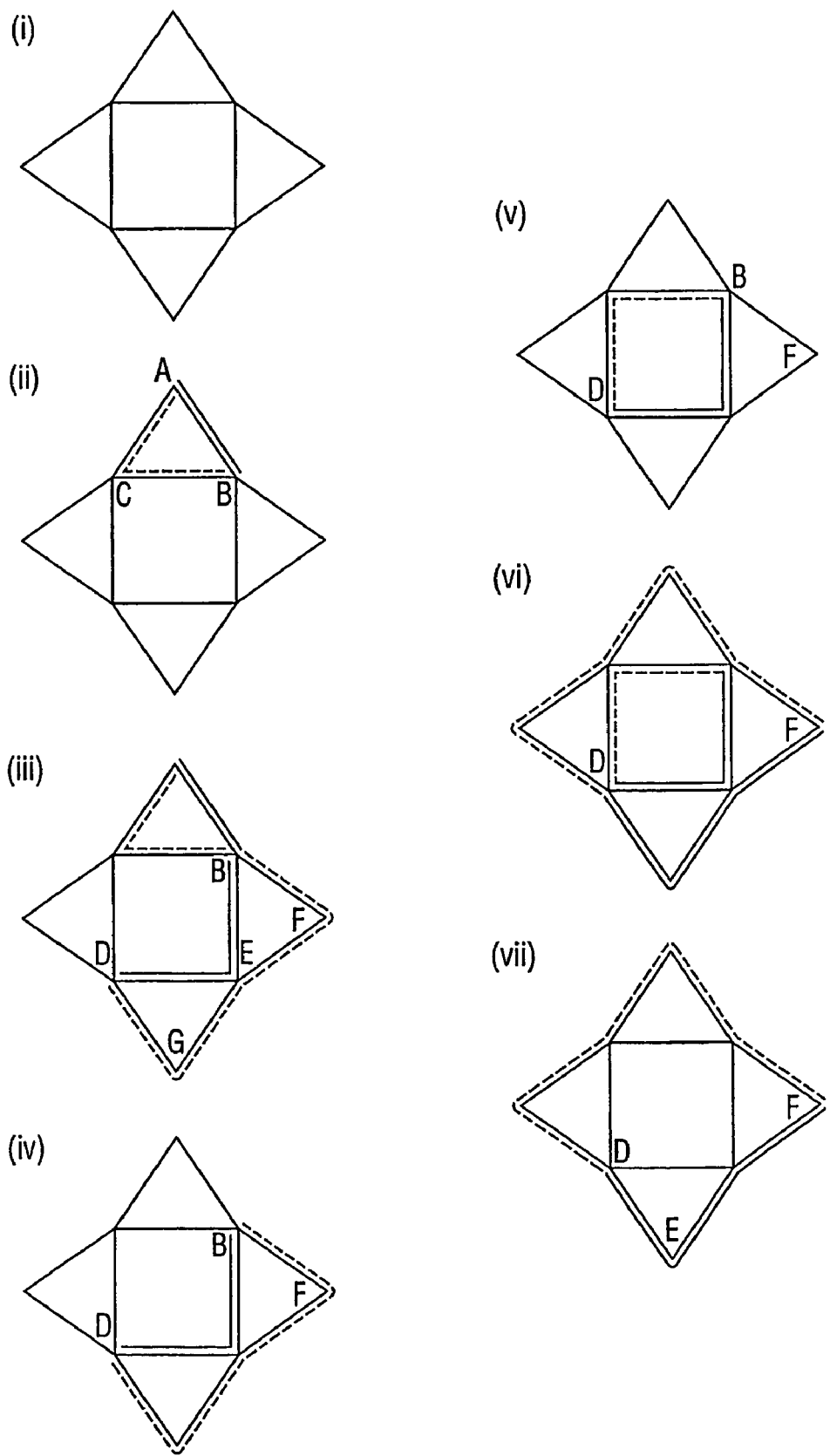
FIG. 7 illustrates the allocation of connections by the network management system of FIG. 6 to a very simple communications network employing routing choice.

With reference to FIG. 7, there will now be described the operation of network resource allocator processor 125 to allocate connections to a very simple communications network employing routing choice.

The network of FIG. 7 (*i*) has eight nodes and twelve links. Each link has only one channel. Hence, in this case, the condition that the main and standby paths of a connection cannot share a link is superfluous; since each link has only one channel it would anyway be impossible for the two paths to share a link FIG. 7 illustrates the changing state of the network over a period of time. Dotted lines represent standby paths and solid lines main paths.

The network begins empty. The first request is for a connection between nodes A and B. Processor 125 accepts this request, and the main path allocated is the single link between A and B, while the standby path has two links and passes through C, see diagram (ii).

Next a connection request between nodes B and D arrives. Processor 125 accepts this. The main path allocated has two links and passes through E, while the standby path has four links and passes through F, E and G, see diagram (iii).

Next, the connection between A and B ends, leaving the network as shown in diagram (iv). Then a connection request between D and F arrives. This cannot be satisfied immediately, since all the links that include node F are already in use. However, processor 125 reconfigures the standby path between B and D, leaving the situation in diagram (v). Processor 125 then allocates the requested connection between D and F, as in diagram (vi).

Next, the connection between B and D ends, leaving the network as shown in diagram (vii). The next request is for a connection between D and E. If the main path being used between D and F were reconfigurable, this could be moved and the new connection could be accepted. However, the main path between D and F is fixed, and, since it already uses all the links that include node E, processor 125 must reject the requested connection between D and E.

In the above description with reference to FIGS. 5, 6 and 7, when reconfiguring an existing connection, the new configuration is always selected from less than all of the possible ways to implement that connection as considered when the connection was first implemented (when the connection was first implemented the main and standby paths of the connection could be selected, whereas when the connection is reconfigured the main path of the connection is fixed and only the standby path of the connection can be selected). It is to be appreciated that the present invention extends to the case of a communications system wherein, sometimes, but not every time, when reconfiguring a connection, all of the previously available ways of carrying the connection are considered.

In the above description with reference to FIGS. 5, 6 and 7, each connection comprises a main and a standby path, and reconfiguration of a connection is limited (i.e. not all possible reconfigurations are permitted) in the sense that only the route of the standby and not the main path can be changed. It is to be appreciated that the present invention extends to the case where each connection comprises a single path, and reconfiguration of a connection is limited in that the new configuration must be selected from less than all of the possible ways to implement the connection as considered when the connection was first implemented. For example, when a single path connection is first implemented there may be a choice of both the route the connection will take and the wavelength the connection will be made on. However, when reconfiguration of the connection is considered, it may only be possible to change the wavelength, not the route, i.e. the route is fixed once the connection is first implemented, thereafter only the wavelength can be changed. The reverse, of course, would also be possible.

Figure 8:
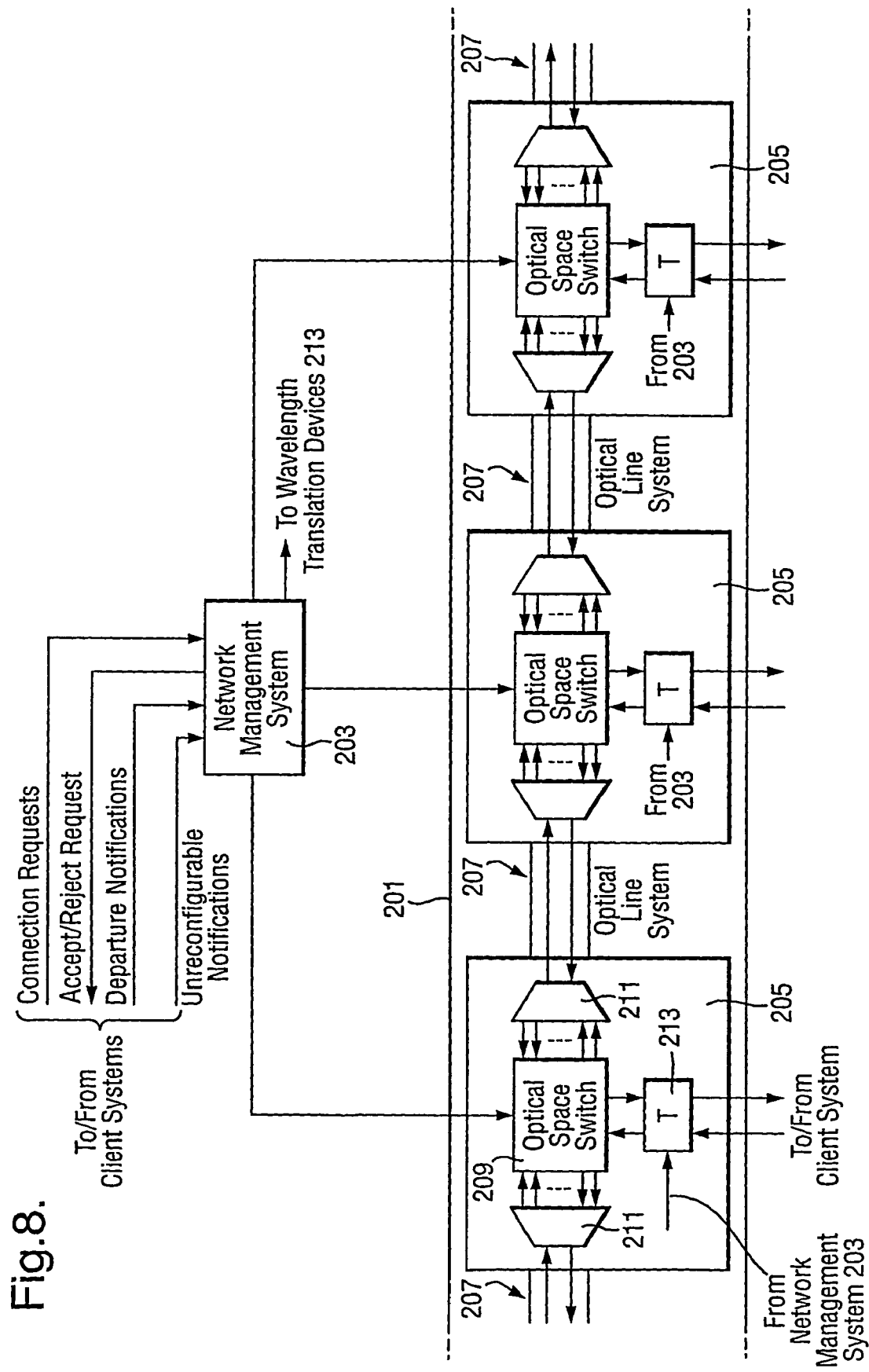
FIG. 8 is a block schematic diagram of a third communications system in accordance with the present invention.

Referring to FIG. 8, the third communications system comprises a communications network 201 and a network management system 203. Network 201 employs wavelength division multiplexing, and is represented by an elemental part of a branch of the network comprising three network nodes 205 and four network links 207. The two links 207 to the extreme left and right of FIG. 8 connect to the remainder of the network. Each node 205 comprises an optical space switch 209, two wavelength division multiplexers 211, and a wavelength translation device 213. Each device 213 is connected to a respective client system (not shown).

Communication over network 201 is possible at each of a number of wavelengths 'n'. However, the network is capable of supporting on any link 207 only one connection at each of the 'a' wavelengths, i.e. the maximum number of possible connections on any link 207 is 'n'. Further, a connection over the network between two client systems must occupy a predetermined set of links 207 between the systems, and must utilise the same wavelength on all links of the set Each wavelength translation device 213 both (i) receives from its client system signals for transmission by the network, and (ii) passes to its client system signals received from the network. Each device 213 both (i) translates signals received from its client system to signals of a selected one of the 'n' wavelengths, and (ii) translates signals of a selected wavelength received from the network to signals of a form suitable for its client system. As explained further below, network management system 203 determines the wavelengths selected. Each optical space switch 209 routes signals over the network. This it does under the control of management system 203. Thus, each switch 209 routes selected wavelength signals (i) from its associated wavelength translation device 213 to an adjacent network node 205, or (ii) to its associated device 213 from an adjacent node 205, or (iii) from one adjacent node 205 to another. Each wavelength division multiplexer 211 both (i) multiplexes together selected wavelength signals received from its associated switch 209, and (ii) demultiplexes apart multiplexed together selected wavelength signals received from an adjacent node 205.

In operation, a client system, say client system A, puts to network management system 203 a request for connection to another client system, say client system B. As explained further below, network management system 203 determines whether a predetermined network route between client systems A and B is or can be made available on any of the aforesaid 'n' wavelengths. If not, system 203 replies rejecting the request. If so, system 203 replies accepting the request, and (i) sets to the selected wavelength the translation devices 213 associated with client systems A and B, and (ii) switches the optical space switches 209 on the aforesaid predetermined route so as to make a connection of the selected wavelength between client systems A and B. Client system A notifies management system 203 when it actually commences use of its connection to client system B. Client system A, on departure from the network, notifies network management system 203.

Figures 9, 10:
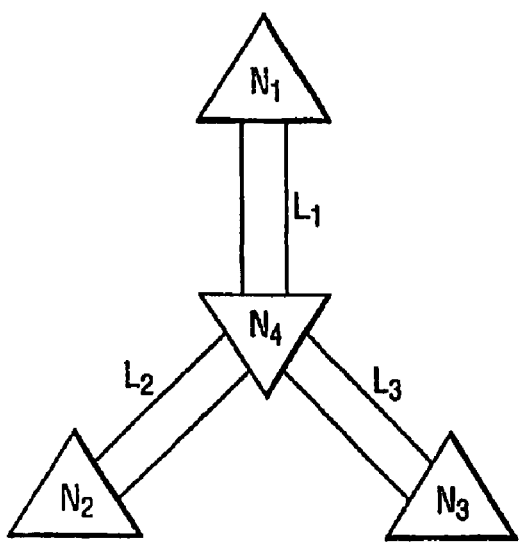
FIG. 9 depicts a very simple communications network employing wavelength division multiplexing.
FIG. 10 illustrates the allocation of connections by the network management system to the very simple network of FIG. 9.

Referring to FIG. 9, each connection request to network management system 203 is received by network coordinator 221, which passes the request on to request memory 223, where it is held in a request queue for subsequent processing by network resource allocator 225. Resource allocator 225 processes the connection request in an attempt to identify network resources that may be allocated to accept the request. The request is for a connection between two client systems, systems A and B. In respect of each and every possible required connection between client systems on the network, there is predefined or pre-assigned one network route to be used in the event that that particular connection is required. Resource allocator 225 has knowledge of these predefined network routes, and determines, as will now be explained, whether the route predefined in respect of the connection between client systems A and B, say route AB, may be used given current network usage. In this regard, network state store 231 maintains a continuously updated record of current network usage.

In response to receipt of the connection request, primary processor 227 examines store 231 to determine whether any one of the aforementioned 'n' wavelengths is entirely absent from the links 207 of route AB, i.e. not one link of route AB uses the wavelength. Let there be 'm' links in route AB denoted $1_1, 1_2, 1_3, \ldots 1_m$. Let the 'n' possible connection wavelengths be denoted $w_1, w_2, w_3, \ldots w_n$. Processor 227 commences with wavelength $w_n$ and examines all 'm' links to determine whether wavelength $w_1$ is being used on one or more of the links. If so, processor 227 continues with wavelength $w_2$, and so on. If at any stage a wavelength is discovered that is not being used, processor 227 informs network coordinator 221 that the connection request can be accepted, and instructs network controller 233 to (i) set the wavelength translation devices 213 associated with client systems A, B to the free wavelength, and (ii) switch the optical space switches 209 on route AB so as to make a connection on the free wavelength between client systems A, B. Network controller 233 updates network state store 231 that it has done this. If, after trying all 'n' wavelengths, primary processor 227 has not discovered a free wavelength on route AB, processor 227 initiates operation of secondary processor 229.

It is to be appreciated that a connection allocated to the network is reconfigurable until actual commencement of use of the connection, i.e. until management system 203 receives from the client system that requested the connection a notification (an 'unreconfigurable notification') of such commencement. The connection then becomes unreconfigurable. Thus, the existing connections on the network are a mix of both reconfigurable and unreconfigurable connections. The record of current network usage contained in network state store 231 includes information as to which of the current network connections are reconfigurable and which are not In a first step, secondary processor 229 examines store 231 to determine whether there is present on the network on wavelength $w_1$ an unreconfigurable connection that includes a link in route AB. If so, processor 229 tries wavelength $w_2$, and so on, until a wavelength is found that is not used by an unreconfigurable connection including a link in route AB. If no wavelength is found, processor 229 informs network coordinator 221 that the connection request cannot be accepted. Assume that wavelengths $w_1$, $w_2$, $w_3$ do not meet the condition, and that wavelength $w_4$ is the first wavelength that does.

In a second step, processor 229 creates a list of all reconfigurable connections on the wavelength $w_4$ that include a link in route AB, i.e. include one or more of the links $1_1$, $1_2$, $1_3$, ... $1_m$. Let this list of connections be $c_1, c_2, c_3, \ldots c_p$. In respect of each of connections $c_1, c_2, c_3, \ldots c_p$, processor 229 examines store 231 to determine whether there is a wavelength other than $w_4$ on which all links of the connection are free. If this is found to be the case for all connections $c_1, c_2, c_3, \ldots c_p$, processor 229 informs network coordinator 221 that the connection request can be accepted, and instructs network controller 233 to (i) reconfigure all connections $c_1, c_2, c_3, \ldots c_p$ to the identified free wavelengths, and (ii) make on wavelength $w_4$ the requested new connection. If in respect of one or more of connections $c_1, c_2, c_3, \ldots c_p$, there is not a wavelength other than $w_4$ on which all links of the connection are free, then processor 229 returns to the first step to consider the next wavelength $w_5$ following $w_4$.

Processor 229 determines (as it did in respect of wavelengths $w_1$ to $w_4$) whether there is on wavelength $w_5$ an unreconfigurable connection that includes a link in route AB. Assume that wavelengths $w_5$ and $w_6$ do not meet this condition, and that wavelength $w_7$ is the next that does. In respect of wavelength $w_7$, processor 229 proceeds again to the second step, and determines (as it did before in respect of wavelength $w_4$) whether it is possible to reconfigure to a free wavelength all the reconfigurable connections on wavelength $w_7$ that include a link in route AB. If so, the new connection request can be accepted on wavelength $w_7$. If not, processor 229 returns to the first step to consider wavelength $w_8$. Processor 229 follows the aforesaid first step/second step procedure until either the new connection request can be accepted, or wavelength $w_n$ is reached without success.

There will now be described the operation of primary and secondary processors 227, 229 to allocate connections to the very simple network of FIG. 10.

The network of FIG. 10 consists of four network nodes N1, N2, N3, N4 and three network links L1, L2, L3. Each link L1, L2, L3 is capable of supporting a connection on each of wavelengths λ1 and λ2, i.e. the aforesaid 'n' equals two. When connections are first set up, they are in a reconfigurable state, i.e. their wavelength may be switched from λ1 to λ2 or visa versa. After some time they become unreconfigurable.

FIG. 11 illustrates the changing state of the FIG. 10 network over a period of time. Dotted lines represent connections in a reconfigurable state, and solid lines represent connections in an unreconfigurable state. The connections are numbered in order of arrival.

The network begins empty. The first arriving request (1) is for a connection on link L1 alone. Processor 227 accepts the request and allocates it to wavelength λ1. After a while, this connection becomes unreconfigurable. The next request (2) is for a connection on links L2 and L3. Processor 227 accepts this request on wavelength λ1 also. This connection then becomes unreconfigurable. The next request (3) is for a connection on link L2. Processor 227 accepts this request on wavelength λ2 (this is the only possible choice since wavelength λ1 on link L2 is already occupied by connection (2)). At this stage the state of the network is as in diagram (i). Note connection (3) has not become unreconfigurable.

Next, connection (2) departs. Another request (4) arrives for a connection on link L3. Processor 227 accepts this request on wavelength λ1. Connection (4) then becomes unreconfigurable. Now the network state is given in diagram (ii). Note connection (3) has still not become unreconfigurable.

A new request (5) arrives for a connection on links L2 and l3. Now, at present, λ1 on L3 is occupied by connection (4), while λ2 on L2 is occupied by connection (3), so there is no wavelength immediately available as determined by processor 227. In an unreconfigurable network, request (5) would have to be rejected at this stage. However, here connection (3) is still in a reconfigurable state, so it is moved by processor 229 to wavelength λ1 (see diagram (iii)). Now processor 229 can accept request (5) on λ2 (diagram (iv)).

Next, connection (3) becomes unreconfigurable. Next, connection (3) departs. The state of the network is now as in diagram (v). Note connection (5) is yet to become unreconfigurable.

Then a new request (6) arrives for a connection on links L1 and L2. However, connection (5) blocks L2 on λ2 while connection (1) blocks L1 on λ1. Connection (1) is unreconfigurable, and connection (5), though itself reconfigurable, cannot be moved due to unreconfigurable connection (4), so processor 229 must reject request (6).

In the foregoing description, the network management system of the communications system comprises a central, unitary system that communicates with the nodes of the network It is to be appreciated that the functionality of the network management system could well be distributed amongst the nodes of the network in which case operation of such distributed system would require communication between the distributed parts of the system.

It is to be appreciated that the approaches to reconfiguration of the above described first, second and third communications systems could be combined. A combination of the approaches of the first and second communications systems would be that each reconfigurable connection of the first communications system could only be reconfigured in less than all the ways of implementing the connection as considered when the connection was first implemented. A combination of the first and third communications systems would be that all connections are reconfigurable until active use begins, thereupon certain connections become unreconfigurable, but the others do not and remain reconfigurable. A combination of the second and third communications systems would be that connections are reconfigurable in all ways possible until active use begins, thereupon they remain reconfigurable but no longer in all ways possible.

The invention claimed is:

1. A communications system comprising: a communications network comprising network nodes and network links between the network nodes; and a network management system for allocating connections to the network, the connections utilizing the network nodes and the network links; in respect of each said connection, there being a number of possible ways to implement the connection in the network; the network management system including a network state store which maintains a continuously updated record of current network usage, and the network management system storing which current network connections are reconfigurable and which are not; the network management system, when allocating the connection to the network, selecting one of the number of possible ways to implement the connection by at least examining the network state store; the network management system, when deciding whether to accept or reject a request for the connection in the network, having an option to accommodate the request for the connection over the network by reconfiguring existing connections in the network by selecting, in respect of at least one existing connection to be reconfigured, a different one of the number of possible ways to implement the at least one existing connection; the reconfiguration by the network management system being constrained to a set of possible reconfigurations which is a subset of the set of all possible reconfigurations of the existing connections in the network, said subset being defined by those reconfigurations that can be carried out with no interruption or impairment of service, or unimportant interruption or impairment of service.

2. The communications system according to claim 1, wherein the existing connections in the network comprise reconfigurable and unreconfigurable connections, and the reconfiguration by the network management system is constrained to reconfiguration of only the reconfigurable connections.

3. The communications system according to claim 2, wherein the network management system reconfigures a reconfigurable connection by changing one of a wavelength on which the connection is made and a route taken by the connection.

4. The communications system according to claim 2, wherein the network management system reconfigures a reconfigurable connection by changing a wavelength on which the connection is made.

5. The communications system according to claim 1, wherein the reconfiguration by the network management system is constrained such that each existing connection in the network is reconfigured, but not every time in all ways possible for that connection.

6. The communications system according to claim 5, wherein each connection comprises a main and a standby path, and the reconfiguration by the network management system is constrained in that only the standby path, and not the main path, of the connection is changed.

7. The communications system according to claim 6, wherein the main and standby paths have in common only two endnodes.

8. The communications system according to claim 5, wherein, when first implementing the connection in the network, it is possible to choose both a route the connection will take and a wavelength on which the connection will be made, the reconfiguration by the network management system being constrained in that only one of the route and the wavelength of the connection is changed, not both.

9. The communications system according to claim 1, wherein the existing connections in the network switch between reconfigurable and unreconfigurable states, and the reconfiguration by the network management system is constrained to reconfiguration of only those existing connections reconfigurable at the time the request for the connection in the network is made.

10. The communications system according to claim 1, wherein a network connection is unreconfigurable if it is a high quality of service connection guaranteed not to experience interruptions.

11. The communications system according to claim 1, wherein each connection allocated to the network can be reconfigured until actual commencement of use of the connection.

12. The communications system according to claim 1, wherein the network management system comprises a network coordinator for receiving a connection request and a memory for holding said request in a queue for processing by a network resource allocator, wherein the network resource allocator of the network management system is adapted to determine if a predefined route for the requested connection can be used given the current network usage.

* * * * *

UNITED STATES PATENT AND TRADEMARK OFFICE
CERTIFICATE OF CORRECTION

| | |
|---|---|
| PATENT NO. | : 7,672,586 B2 |
| APPLICATION NO. | : 10/508749 |
| DATED | : March 2, 2010 |
| INVENTOR(S) | : Martin |

It is certified that error appears in the above-identified patent and that said Letters Patent is hereby corrected as shown below:

On Title Page 2, in Field (56), under "OTHER PUBLICATIONS", in Column 2, Line 3, delete "Proceedings.," and insert -- Proceedings. --, therefor.

In Column 1, Line 4, delete "01373" and insert -- 01373, filed on --, therefor.

In Column 1, Line 14, delete "Bach" and insert -- Each --, therefor.

In Column 2, Line 14, delete "network" and insert -- network. --, therefor.

In Column 2, Line 31, delete "not" and insert -- not. --, therefor.

In Column 4, Line 4, delete "network" and insert -- network. --, therefor.

In Column 5, Line 14, delete "unreconfigtrable" and insert -- unreconfigurable --, therefor.

In Column 5, Line 17, delete "not" and insert -- not. --, therefor.

In Column 6, Line 60, delete "165" and insert -- 105 --, therefor.

In Column 7, Line 6, delete "path" and insert -- path. --, therefor.

In Column 9, Line 37, delete "'a'" and insert -- 'n' --, therefor.

In Column 9, Line 41, delete "set" and insert -- set. --, therefor.

In Column 10, Line 38, delete "$w_n$" and insert -- $w_1$ --, therefor.

In Column 10, Line 63, delete "not" and insert -- not. --, therefor.

In Column 11, Line 19, delete "If and insert -- If, --, therefor.

In Column 12, Line 6, delete "13." and insert -- L3. --, therefor.

Signed and Sealed this
First Day of March, 2011

David J. Kappos
*Director of the United States Patent and Trademark Office*

CERTIFICATE OF CORRECTION (continued)
U.S. Pat. No. 7,672,586 B2

In Column 12, Line 26, delete "network" and insert -- network. --, therefor.

In Column 12, Line 29, delete "network" and insert -- network, --, therefor.